(12) United States Patent
Kinoshita et al.

(10) Patent No.: US 8,120,604 B2
(45) Date of Patent: Feb. 21, 2012

(54) OBJECT EDITING SYSTEM, OBJECT EDITING METHOD AND OBJECT EDITING PROGRAM PRODUCT

(75) Inventors: Satoko Kinoshita, Yokohama (JP); Keiji Miura, Yamato (JP); Eiki Shibata, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1186 days.

(21) Appl. No.: 11/321,544

(22) Filed: Dec. 29, 2005

(65) Prior Publication Data

US 2006/0174568 A1 Aug. 10, 2006

(30) Foreign Application Priority Data

Jan. 4, 2005 (JP) ................................ 2005-000007

(51) Int. Cl.
*G06T 15/00* (2011.01)
*G02B 27/22* (2006.01)

(52) U.S. Cl. ........ 345/419; 345/440; 345/441; 715/232; 715/205

(58) Field of Classification Search .................. 345/419, 345/440–441; 715/501.1–517, 232, 205
See application file for complete search history.

(56) References Cited

U.S. PATENT DOCUMENTS

| 5,844,558 | A | * | 12/1998 | Kumar et al. | 345/440.2 |
| 5,982,383 | A | * | 11/1999 | Kumar et al. | 345/440 |
| 6,144,974 | A | * | 11/2000 | Gartland | 715/517 |
| 6,448,964 | B1 | * | 9/2002 | Isaacs et al. | 345/419 |
| 6,993,709 | B1 | * | 1/2006 | Lynn et al. | 715/502 |

* cited by examiner

*Primary Examiner* — Jin-Cheng Wang
(74) *Attorney, Agent, or Firm* — Daniel McLoughlin; Hoffman Warnick LLC

(57) ABSTRACT

The present invention provides a snap function that can move an object smoothly, without deteriorating the user operability. According to the present invention, there is provided an object editing system, including: an arrangement system for arranging an object and a snap target in a given display area; a moving system for moving the object in the display area; a snap system for causing the object to snap the snap target on a basis of a distance between the object and the snap target; and a restriction system for inhibiting the object from snapping the snap target on a basis of a direction in which the object is moving. According to the object editing system of the invention, the snap system causes the object to snap the snap target once the distance between the object and the snap target has become smaller than a predetermined threshold value.

15 Claims, 8 Drawing Sheets

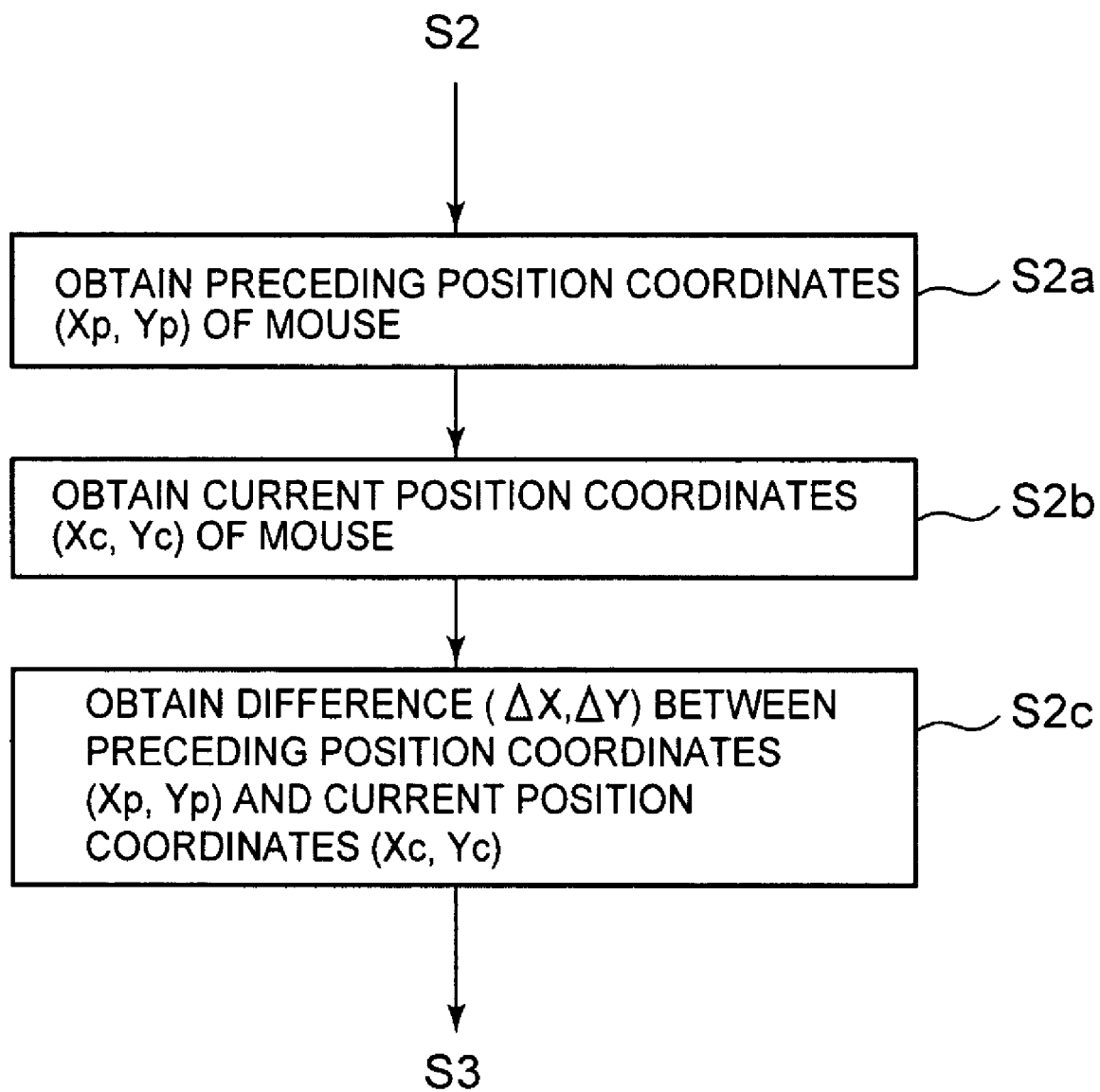

OBJECT EDITING SYSTEM, OBJECT EDITING METHOD AND OBJECT EDITING PROGRAM PRODUCT

FIELD OF THE INVENTION

The present invention relates to a technique for using a computer to edit electronic documents. Particularly, the present invention relates to a system for editing objects in electronic documents, an object editing method and an object editing program product.

BACKGROUND OF THE INVENTION

When computers are employed for the layout editing of electronic documents, object snap functions are frequently used by electronic document layout editing tools to position objects at desired locations. When, for example, an object is continuously selected by means of a mouse and is moved (dragged) to a desired grid, the snap function aids in the object's being automatically arranged on a grid in a work area or on another object.

An electronic document layout editing screen is shown in FIG. 8. A plurality of vertical grids 101a to 101e and horizontal grids 102a to 102c are arranged on a screen 103. In the state shown in FIG. 8, a snap function has been used to move a selected object 100 to a position indicated by an object 100'. It can be seen that the object 100' has been snapped to the vertical grid 101b and the horizontal grid 102b.

This snap function is an important function for the efficient arrangement of objects relative to grids and other objects, and is very frequently employed by users. When the interval between grids used as references is short, or when many other objects are present, the snap function must perform more work than necessary to move a specific object to a desired location, and therefore moving the object smoothly may be difficult.

This problem will be explained while referring to FIG. 9. FIG. 9 is a diagram, showing a screen 103, for explaining the operating frequency of a conventional snap function whereby an object 100 has been moved to a location indicated by an object 100'. Assume that reference numeral 104 denotes a mouse (a mouse pointer), and 100a, 100b, 100c and 100d respectively denote the right, left, upper and lower sides of the object 100. A total of eight snaps (Snap 1 to Snap 8) occurred before the object 100 was moved to the location indicated by the object 100', i.e., until the right side 100a snapped a vertical grid 101f. In this example, the left side 100b snapped a vertical grid 101b, the lower side 100d snapped a horizontal grid 102c, the right side 100a snapped a vertical grid 101d, the upper side 100c snapped a horizontal grid 102b, the left side 100b snapped a vertical grid 101c, the right side 100a snapped a vertical grid 101e, the left side 100b snapped a vertical grid 101d, and thereafter, the right side 100a snapped the vertical grid 101f.

As described above, when the conventional snap function is employed, the function must perform more work than necessary to move a specific object to a desired location, and this hinders the smooth movement of the object.

A technique for improving the above described conventional snap function is disclosed in Japanese Patent Laid-Open Publication No. 2001-281835. According to the technique disclosed in this reference, of four snap points for an object selected by a mouse, only the snap point closest to the mouse cursor is set to a snappable condition, and is snapped as a snap candidate point.

According to the technology disclosed in Japanese Patent Laid-Open Publication No. 2001-281835, while it is possible to suppress unnecessary snaps caused when moving an object to some extent, only a snap point closest to a mouse cursor is in a snappable condition out of four snap points of the object and therefore there is a limit in the number of snap points in the snappable condition, thereby deteriorating the operationality problematically.

Moreover, in the conventional snap function, there has also been known a technology of inhibiting the snap function from being operated unnecessarily by temporarily invalidating the snap function with a combination of a drag-and-drop operation with a mouse and a keyboard operation, in other words, with a depression of a shift key or the like on a keyboard at the time of the drag-and-drop operation.

By using these conventional snap functions, it is possible to move the object relatively smoothly. These functions, however, require simultaneous processing of a plurality of operations such as the combination of the drag-and-drop operation and the keyboard operation, which necessarily requires operations with both hands and thereby deteriorates the operationality. Furthermore, it has been hard for a user to find the operation method of the combined plurality of operations and to learn the operation method.

Due to these circumstances, the foregoing conventional snap functions cannot move the object smoothly without deteriorating the operationality, thereby hindering an improvement in usability in object editing of an electronic document.

SUMMARY OF THE INVENTION

Therefore, in view of these problems, the present invention has been provided. It is an object of the present invention to provide a snap function for realizing a smooth movement of an object without deteriorating the operationality, to increase an editing efficiency of the object, and to improve usability.

According to the present invention, there is provided an object editing system that includes: arrangement means for arranging an object and a snap target in a given display area; moving means for moving the object in the display area; snap means for causing the object to snap the snap target on a basis of a distance between the object and the snap target; and restriction means for inhibiting the object from snapping the snap target on a basis of a direction in which the object is moving.

The snap means causes the object to snap the snap target if the distance between the object and the snap target has become smaller than a predetermined threshold value.

A plurality of snap targets may be present on a path along which the object moves.

The restriction means may inhibit the object from snapping the snap target present on the side opposite to the direction in which the object is moving.

The object may have a plurality of snap references, and the snap means may cause a snap reference to snap a snap target based on a distance between the snap reference and the snap target, and the restriction means may inhibit the snap references that are present on the side opposite to the direction in which the object is moving from snapping a snap target.

The restriction means may cause the snap references that are present on the same side as the direction in which the object is moving to snap the snap target.

The display area is a two-dimensional display area defined by a vertical axis and a horizontal axis. The restriction means may inhibit the snap references that are present on the side opposite to a vertical component of the direction in which the object is moving from snapping the snap target, or inhibit the snap references that are present on the side opposite to a horizontal component of the direction in which the object is moving from snapping the snap target.

The display area is a two-dimensional display area defined by a vertical axis and a horizontal axis. The restriction means may inhibit the snap references that are present on the side opposite to a vertical component of the direction in which the object is moving from snapping the snap target, and inhibit the snap references that are present on the side opposite to a horizontal component of the direction in which the object is moving from snapping the snap target.

The display area is a two-dimensional display area, the form of the object is a rectangle, and the snap targets are a plurality of vertical grid lines and a plurality of horizontal grid lines. The snap means may cause a side of the object to snap a vertical grid line or a horizontal grid line on the basis of a distance between the side of the object and the vertical grid line or the horizontal grid line. The restriction means may inhibit the sides of the object that are present on the side opposite to the direction in which the object is moving from snapping the vertical grid lines or the horizontal grid lines.

Of the plurality of horizontal grid lines, the snap means may select a horizontal grid line closest to the side of the rectangle that is present along the vertical component of the direction in which the object is moving, and may cause the side to snap the selected horizontal grid line if the distance between the side and the horizontal grid line has been become smaller than a first threshold value. Further, of the plurality of vertical grid lines, the snap means may select a vertical grid line closest to the side of the rectangle that is present along the horizontal component of the direction in which the object is moving, and may cause the side to snap the selected vertical grid line if the distance between the side and the vertical grid line has become smaller than a second threshold value.

The restriction means may inhibit the sides of the rectangle on the side opposite to the vertical component of the direction in which the object is moving from snapping the horizontal grid lines, and may inhibit the sides of the rectangle on the side opposite to the horizontal component of the direction in which the object is moving from snapping the vertical grid lines.

The moving means may have a pointing device for displaying a pointer in the display area.

As a user manipulates the pointing device, the moving means may move the object designated by the pointer.

The pointing device may be a mouse.

In the display area, the direction in which the object is moving matches the direction in which the pointer is moving.

The display area is a two-dimensional display area defined by a vertical axis and a horizontal axis, and the direction in which the object is moving is either up rightward, directly rightward, down rightward, directly upward, directly downward, up leftward, directly leftward or down leftward.

According to the present invention, there is provided an object editing method that includes the steps of: arranging an object and a snap target in a given display area; and in response to a movement of the object in the display area, causing the object to snap the snap target on a basis of a distance between the object and the snap target while inhibiting the object from snapping the snap target on a basis of a direction in which the object is moving.

According to the invention, provided is an object editing method that includes the steps of: arranging an object and a snap target in a predetermined two-dimensional display area defined by a vertical axis and a horizontal axis; constituting the object as a rectangle; preparing a plurality of vertical grid lines and a plurality of horizontal grid lines as the snap target; in response to a movement of the object in the display area, causing a side of the rectangle to snap a horizontal grid line or a vertical grid line on a basis of a distance between the side and the horizontal grid line or the vertical grid line while inhibiting sides of the rectangle on a side opposite to the moving direction of the object from snapping the horizontal and vertical grid lines According to the invention, provided is an object editing method that includes the steps of: inhibiting the sides of the rectangle that are on the side opposite to a vertical component of the direction in which the object is moving from snapping the horizontal grid lines, and inhibiting the sides of the rectangle that are on the side opposite to a horizontal component of the direction in which the object is moving from snapping the vertical grid lines.

According to the present invention, there is provided an object editing program product for enabling a computer to execute the steps of: arranging an object and a snap target in a given display area; and in response to a movement of the object in the display area, causing the object to snap the snap target on a basis of a distance between the object and the snap target while inhibiting the object from snapping the snap target on a basis of a direction in which the object is moving.

According to the invention, provided is an object editing program product that permits a computer to perform the steps of: arranging an object and a snap target in a predetermined two-dimensional display area defined by a vertical axis and a horizontal axis; constituting the object as a rectangle; preparing a plurality of vertical grid lines and a plurality of horizontal grid lines as the snap target; in response to a movement of the object in the display area, causing a side of the rectangle to snap a horizontal grid line or a vertical grid line on a basis of a distance between the side and the horizontal grid line or the vertical grid line while inhibiting sides of the rectangle on the side opposite to the moving direction of the object from snapping the horizontal and vertical grid lines.

According to the invention, provided is an object editing program product that permits a computer to perform the steps of: inhibiting the sides of the rectangle that are on the side opposite to a vertical component of the direction in which the object is moving from snapping the horizontal grid lines, and inhibiting the sides of the rectangle that are on the side opposite to a horizontal component of the direction in which the object is moving from snapping the vertical grid lines.

According to the present invention, the number of snap function operations that must be performed to move an object can be reduced, and the smooth movement of the object can be achieved without deteriorating user operability. As a result, the efficiency of object editing is increased, and usability is improved.

BRIEF DESCRIPTION OF THE DRAWINGS

FIG. 4 is a flowchart showing the processing performed by the object editing method according to an embodiment of the invention to calculate a direction in which a mouse is moving;

DETAILED DESCRIPTION OF THE INVENTION

Figure 1:
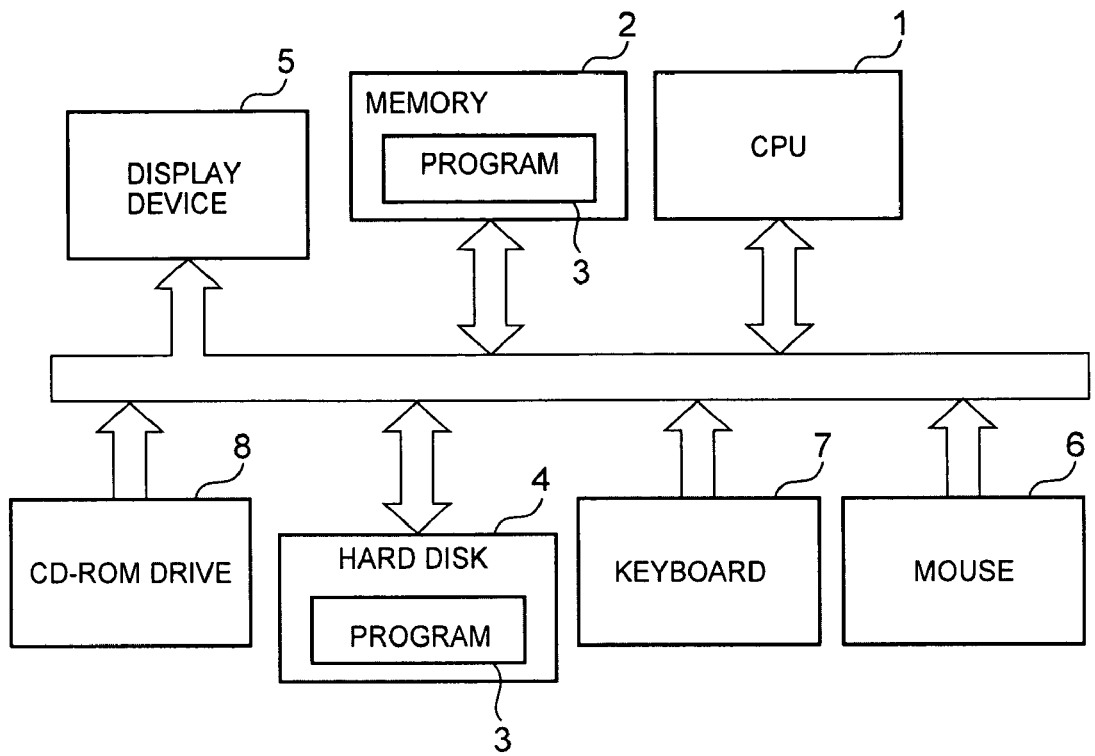
FIG. 1 is a schematic diagram showing the configuration of an object editing system according to one embodiment of the present invention.

An embodiment of the present invention will now be specifically described while referring to FIG. 1. FIG. 1 is a schematic diagram showing the configuration of an object editing system according to an embodiment of the invention. The object editing system in this embodiment includes a central processing unit (CPU) 1, a memory 2, an object editing program 3, a hard disk 4, a display device 5, a mouse 6, a keyboard 7 and a CD-ROM drive 8.

The CPU 1 is a device for executing the object editing program 3. The memory 2 is a storage device into which the object editing program 3, which is stored on the hard disk 4, is temporarily loaded for execution. The mouse 6 and the keyboard 7 are data input devices a user employs when inputting commands to be executed by the CPU 1, or when using the object editing program 3. The CD-ROM drive 8 is a device used, in accordance with a command issued by the CPU 1, to transfer the object editing program 3, stored on a CD-ROM, to the hard disk 4.

The CPU 1 and the object editing program 3, when it has been loaded into the memory 2, cooperate in the execution of the object editing method of the present invention.

Figure 2:
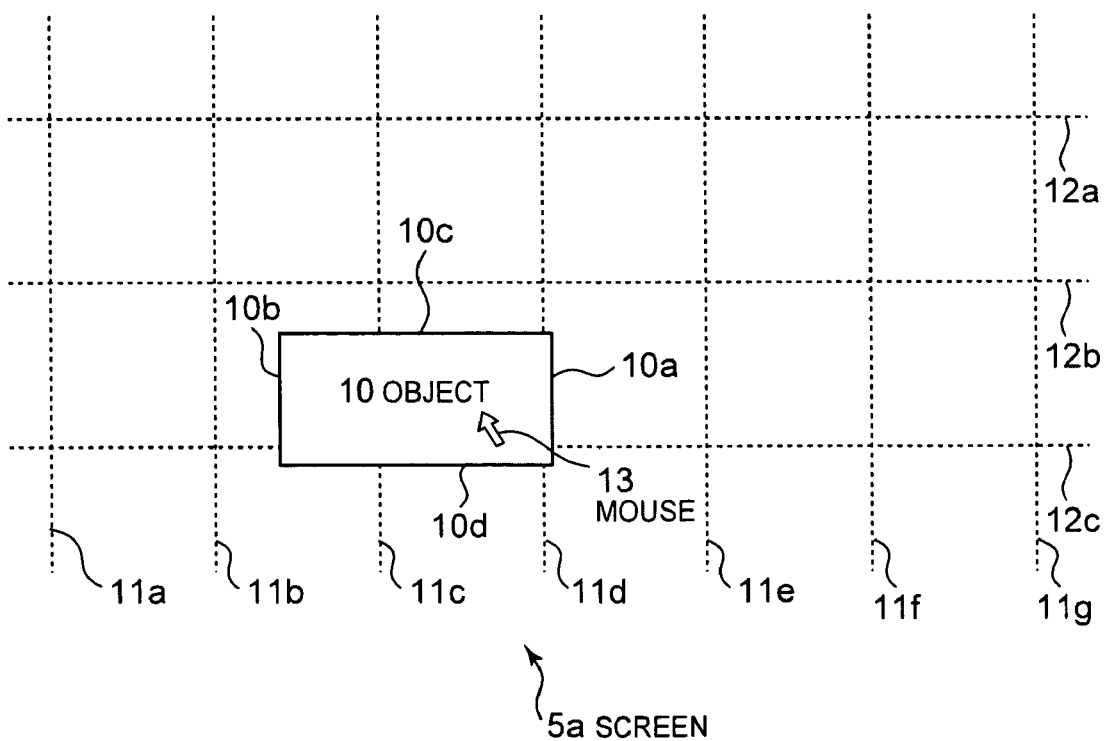
FIG. 2 is a diagram showing an example of display on the screen of a display device when an object editing program according to an embodiment of the invention is executed.

An explanation will be given while referring to FIG. 2. FIG. 2 is a diagram showing an example of display on a screen 5a of the display device 5, when the object editing program of this invention is executed. There are a plurality of vertical grids 11a to 11g and a plurality of horizontal grids 12a to 12c on the screen 5a, arranged within a predesignated two-dimensional display area by grid arrangement means. The grids serve as reference lines when an object in the display area is being edited and are used as snap targets for an object. Note that, although in FIG. 2 the grids are displayed, under other circumstances they may not be visible. It is also noted, when the object editing program of the invention is executed, the available grids are not limited to the vertical grids 11a to 11g and the horizontal grids 12a to 12c, which are merely a set of grids. A mouse (a pointer for a mouse) denoted by reference numeral 13 is employed in this embodiment as a pointing device for moving the pointer. However, another pointing device may be employed.

An object 10 is also displayed on the screen 5a. The form of the object 10 is a rectangle, and in this embodiment, the right side, the left side, the upper side and the lower side of the rectangle are respectively denoted by 10a, 10b, 10c and 10d. In this invention, the right side, the left side, the upper side or the lower side of the rectangle, which is an edge line of the object 10, is used as a snap reference relative to a grid that is a snap target for the object 10.

As the feature of the object editing method of the invention, when the object 10 is to be moved to a desired location, the snap function is automatically enabled only for a side of the rectangle of the object 10 in the direction in which the object 10 moves. That is, the snap function is automatically disabled for a side of the rectangle located opposite to the direction in which the object 10 moves.

According to the object editing method of the invention, there are eight patterns, shown in Table 1 below, that reflect the relationship between the direction in which the object 10 moves, i.e., the direction in which the mouse 13 moves, and the side (the right side 10a, the left side 10b, the upper side 10c or the lower side 10d) of the rectangle of the object 10 for which the snap function is enabled.

TABLE 1

| Pattern of a direction in which a mouse moves | Side of a rectangle of an object for which a snap function is enabled | | | |
|---|---|---|---|---|
| | Upper side | Lower side | Right side | Left side |
| 1 Up rightward | ○ | | ○ | |
| 2 Directly rightward | | | ○ | |
| 3 Down rightward | | ○ | ○ | |
| 4 Directly up | ○ | | | |
| 5 Directly down | | ○ | | |
| 6 Up left | ○ | | | ○ |
| 7 Directly left | | | | ○ |
| 8 Down leftward | | ○ | | ○ |

○: Enabled

According to the object editing method of the invention, the side of the rectangle for which the snap function is enabled and the side of the rectangle for which the snap function is disabled are determined based on the eight patterns in Table 1 on the basis of the direction in which the mouse 13 moves, so that the number of snap operations can be reduced and the object 10 can be moved smoothly.

Figure 3:
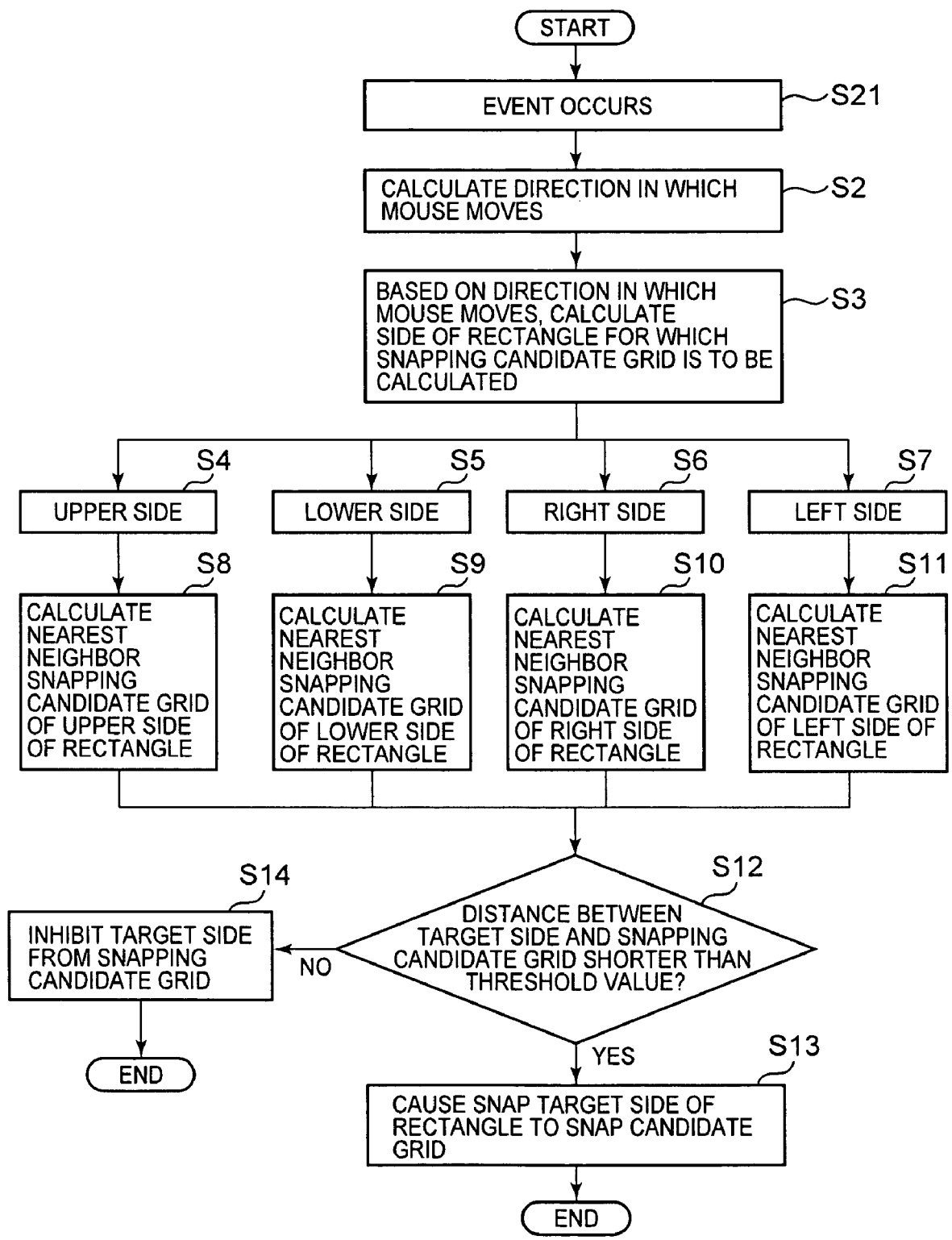
FIG. 3 is a flowchart showing an object editing method according to an embodiment of the present invention.

An explanation will be given while referring to FIG. 3. FIG. 3 is a flowchart showing the object editing method of the invention. In this embodiment, an "event" means a phenomenon that, through the manipulation of the mouse 13 by a user (e.g., by keeping depressing the left button of the mouse 13), the object 10 is selected and held, and thereafter the position of the mouse 13 (the position of the mouse pointer) is changed.

First, through manipulation of the mouse 13 by the user, a moving means is operated, the object 10 is selected and held, and the position of the mouse 13 is changed, i.e., an event occurs (step S1).

Next, the vertical direction and the horizontal direction in which the mouse 13 moves (the vertical component and the horizontal component of the direction in which the mouse 13 moves) are calculated (step S2). specifically, the process at step S2 is performed by three steps, as shown in FIG. 4 (steps S2a, S2b and S2c). At step S2, the preceding position coordinates of the mouse 13 (the position coordinates before the event occurred) (Xp, Yp) are obtained (step S2a). Then, the current position coordinates of the mouse 13 (the position coordinates following the occurrence of the event) (Xc, Yc) are obtained (step S2b). Thereafter, a difference between the preceding position coordinates and the current position coordinates, i.e., $(\Delta X, \Delta Y) = (Xc-Xp, Yc-Yp)$, is calculated. In accordance with the difference $(\Delta X, \Delta Y)$, the direction in which the mouse 13 moves is determined. The relationship between the difference $(\Delta X, \Delta Y)$ and the direction in which the mouse 13 moves is as shown in Table 2.

TABLE 2

| | Pattern of direction in which a mouse moves | | Side of a rectangle for which a candidate grid is calculated | | | |
|---|---|---|---|---|---|---|
| | | | (S4) Upper side | (S5) Lower side | (S6) Right side | (S7) Left side |
| 1 | $\Delta x > 0, \Delta y > 0$ | Up rightward | o | | o | |
| 2 | $\Delta x > 0, \Delta y = 0$ | Directly rightward | | | o | |
| 3 | $\Delta x > 0, \Delta y < 0$ | Down rightward | | o | o | |
| 4 | $\Delta x = 0, \Delta y > 0$ | Directly up | o | | | |
| 5 | $\Delta x = 0, \Delta y < 0$ | Directly down | | o | | |
| 6 | $\Delta x < 0, \Delta y > 0$ | Up leftward | o | | | o |
| 7 | $\Delta x < 0, \Delta y = 0$ | Directly left | | | | o |
| 8 | $\Delta x < 0, \Delta y < 0$ | Down leftward | | o | | o | o: Selected

Sequentially, the side of the rectangular object 10 for which the snap function is enabled, i.e., the side of the rectangle for which a grid (a snapping candidate grid) which the object 10 is to snap is to be calculated, is calculated based on the direction in which the mouse 13 moves, which is obtained at step S2 (step S3). The process at step S3 is performed based on the eight patterns shown in Table 2 for the direction in which the mouse 13 moves, and the corresponding sides of the rectangle for which the snapping candidate grids are calculated. As shown in Table 2, the upper side and the right side of the rectangle are the sides that correspond to a difference ($\Delta X>0$, $\Delta Y>0$), and for which snapping candidate grids are to be calculated. And the right side of the rectangle is the side that corresponds to a difference ($\Delta X>0$, $\Delta Y=0$), and for which a snapping candidate grid is to be calculated. In this manner, based on the calculation results obtained for the difference ($\Delta X$, $\Delta Y$), at most two sides or at least one side of the rectangle is obtained. As shown in FIG. 2, when two sides of the rectangle are obtained, because of the properties of this invention, these should be the upper side or the lower side and the right side or the left side. Further, (S4), (S5), (S6) and (S7) in Table 2 correspond to the step numbers in FIG. 3.

Based on the calculation results obtained at step S3, at most two steps or at least one step of steps S4 to S7 is performed. For example, when the upper side and the right side have been calculated at step S3, the upper side (step S4) and the right side (step S6) are selected. When the lower side and the left side have been calculated at step S3, the lower side (step S5) and the left side (step S7) are selected.

When step S4 is selected, step S8 is performed; when step S5 is selected, step S9 is performed; when step S6 is selected, step S10 is performed; and when step S7 is selected, step S11 is performed.

At steps S8 and S9, the nearest neighbor snapping candidate grid (horizontal grid) of the selected side of the rectangle is calculated. At steps S10 and S11, the nearest neighbor snapping candidate grid (vertical grid) for the selected side of the rectangle is calculated. For example, at step S8, the nearest neighbor snapping candidate grid for the upper side of the rectangle is calculated, and at step S10, the nearest neighbor snapping candidate grid for the right side is calculated. As a result, at most two or at least one snapping candidate grid is calculated in accordance with the direction in which the mouse 13 moves.

Then, a check is performed to determine whether the distances between the snapping candidate grids obtained at steps S8 to S11 and the target sides of the rectangle are smaller than predesignated threshold values (a threshold value Xth in the X direction and a threshold value Yth in the Y direction) (step S12). When the distances are smaller than the threshold values, the target sides of the rectangle are caused to snap the corresponding snapping candidate grids (step S13), and the processing is thereafter terminated (END). When the distances are equal to or greater than the threshold values, the sides of the rectangle are inhibited from snapping the snapping candidate grids (step S14), and the processing is terminated (END). For example, assume that the direction in which the mouse 13 moves is down rightward, and that, in accordance with the results obtained at steps S9 and S10, a horizontal grid that is upper adjacent is obtained as the nearest neighboring snapping candidate grid for the lower side of the rectangle, and a vertical grid that is left adjacent is obtained as the nearest neighboring snapping candidate grid for the right side of the rectangle. When the distance between the lower side of the rectangle and the obtained horizontal grid is smaller than the threshold value Yth, and when the distance between the right side of the rectangle and the obtained vertical grid is smaller than the threshold value Xth, the lower side and the right side of the rectangle are caused to snap the horizontal grid and the vertical grid, respectively. On the other hand, when the distance between the lower side of the rectangle and the obtained horizontal grid is smaller than the threshold value Yth, and when the distance between the right side of the rectangle and the obtained vertical grid is equal to or greater than the threshold value Xth, the lower side of the rectangle is caused to snap the horizontal grid, but the right side of the rectangle is inhibited from snapping the vertical grid. It should be noted that the same value may be set for the vertical threshold value Yth and the horizontal threshold value Xth, or that different values may be set.

Alternatively, when the distances between the sides of the rectangle of the object that are snap references and grids that are snap targets are equal to or smaller than threshold values (Xth, Yth), the side may be caused to snap the grid.

By repeating the above described processing shown in FIG. 3, the snap function can be enabled only for the sides of the rectangle that are on the side in the direction in which the object 10 moves, and can be disabled for the sides of the rectangle that are on the side opposite to the direction in which the object 10 moves. Therefore, the number of snap operations can be reduced and the object 10 can be moved smoothly using the mouse 13, so that the object drag-and-drop operation and the usability can be improved.

Furthermore, according to the object editing method of the invention, compared with the conventional complicated snap function such as the method whereby the snap function is temporarily disabled by simultaneously using the shift key, the object editing operation can be performed automatically, using a single hand, without any need to learn complicated snap function, and the frequency at which the snap function occurs can be reduced.

According to the object editing method of the invention, the object 10 can be caused to snap only a grid located in the direction in which the object 10 is moving. When in FIG. 2, for example, the left side 10b of the rectangle object 10, is to be snapped the vertical grid 11c, the left side 10b is first moved to the right of the vertical grid 11c, and then the object 10 is moved to the left. Thus, the left side 10b of the rectangle object 10, can be caused to snap the vertical grid 11c.

While referring to FIGS. 5A and 5B, an explanation will be given for example processing, performed by the object editing system that employs the object editing method in the above described embodiment, for moving the object 10 in a direction (upper right) indicated by arrows in FIG. 5B.

Figure 5A:
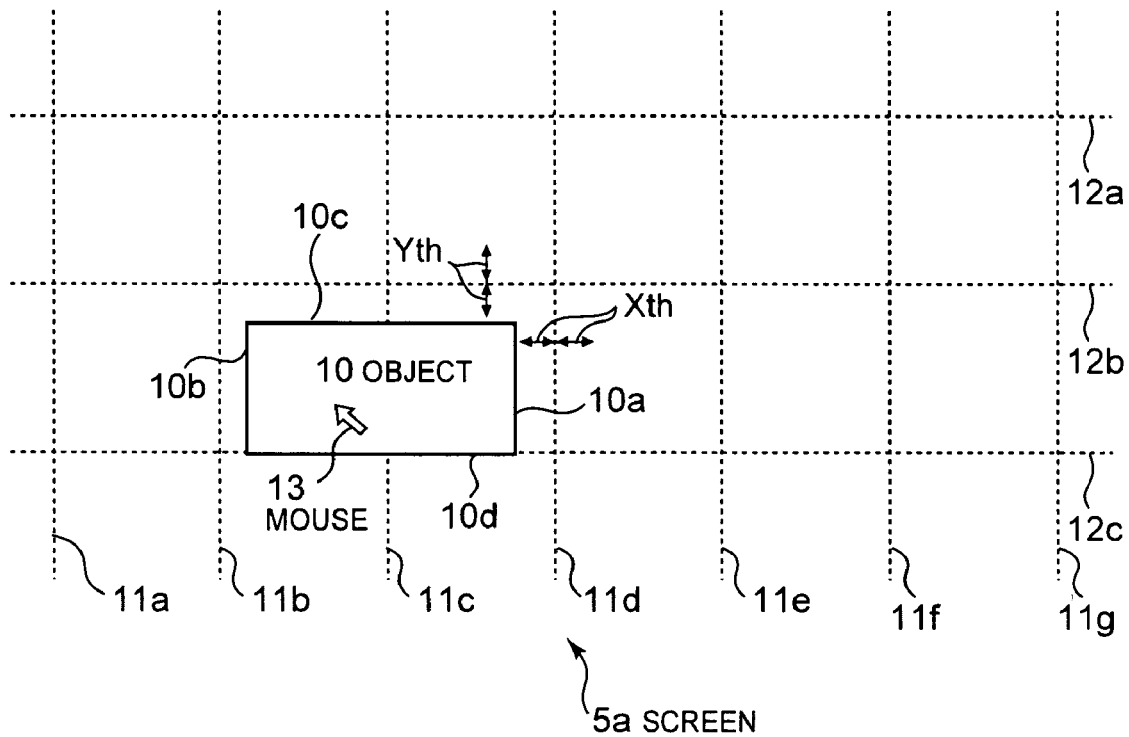
FIG. 5A is a diagram showing the state of an object before an event occurs.

FIG. 5A is a diagram showing the state of the object 10 before an event occurs. FIG. 5B is a diagram showing the state of an object 10' after the event has occurred and the snap function has been employed.

Figure 5B:
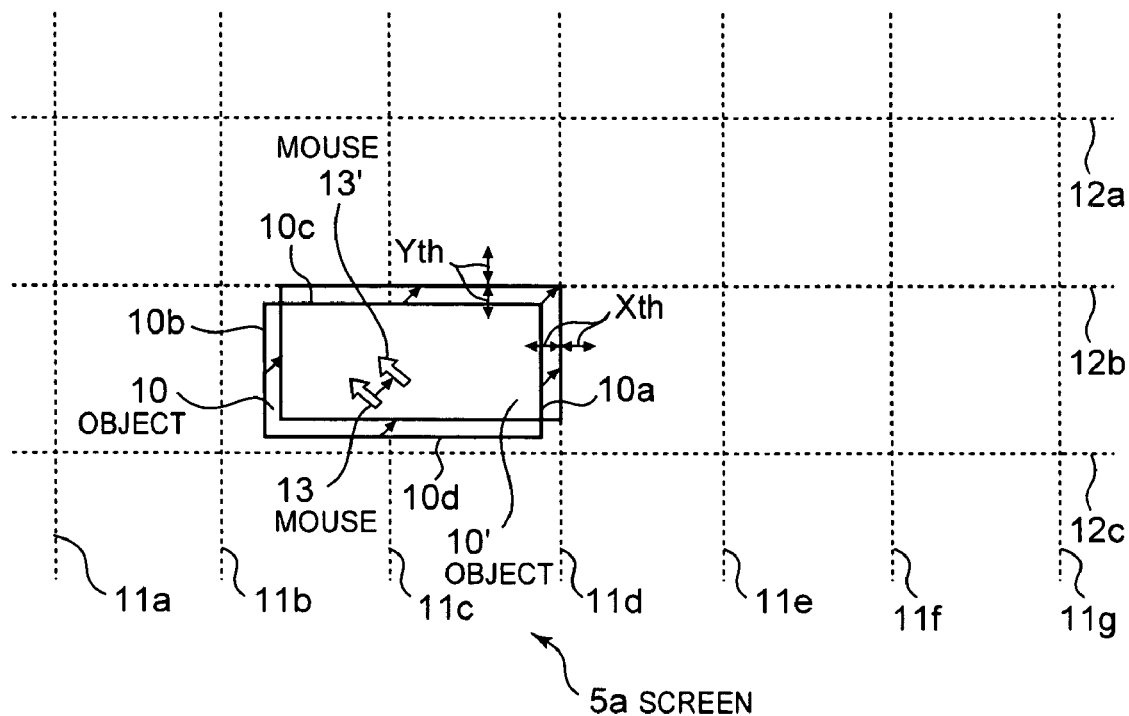
FIG. 5B is a diagram showing the state of the object after an event has occurred and a snap function has been employed.

In this embodiment, as shown in FIG. 5B, it is assumed the distance between the right side of the object 10' and the vertical grid 11d after the event occurred is smaller than the threshold value Xth, and the distance between the upper side of the object 10' and the horizontal grid 12b is smaller than the threshold value Yth. It is understood that the right side and the upper side of the object 10' are caused to snap the vertical grid 11d and the horizontal grid 12b.

The processing, performed using the object editing method of this embodiment, will now be described while referring to FIG. 6.

First, through user manipulation of the mouse 13, the object 10 is selected and held, and the position of the mouse 13 (the pointer of the mouse 13) is changed, i.e., an event occurs (step S1). In this embodiment, it is assumed that the position of the mouse 13 is changed to the upper right position.

Next, the direction in which the mouse 13 is moving is calculated (step S2). As described above, the process at step S2 is performed in three steps in FIG. 4 (steps S2a, S2b and S2c). At step S2, the preceding position coordinates of the mouse 13 (the position coordinates before the event occurred) (Xp, Yp) are obtained (step S2a). Then, the current position coordinates of the mouse 13 (the position coordinates after the event occurred, i.e., the position coordinates for a mouse 13') (Xc, Yc) are obtained (step S2b). Thereafter, a difference between the preceding position coordinates and the current position coordinates, i.e., (ΔX, ΔY)=(Xc−Xp, Yc−Yp), is calculated. In this embodiment, a difference (ΔX>0, ΔY>0) is obtained.

Sequentially, the sides of the rectangle, for which possible grids (snapping candidate grids) the object 10 is to snap are to be calculated, are calculated based on the direction in which the mouse 13 moves. The result is obtained at step S2 (step S3). In this embodiment, by referring to Table 2, the upper side and the right side of the rectangle are the sides that correspond to the difference (ΔX>0, ΔY>0), and that are targets for which the snapping candidate grids are to be calculated.

Since the upper side and the right side are obtained at step S3, the upper side (step S4) and the right side (S6) are selected.

Following this, steps S8 and S10 are preformed. At step S8, the nearest neighbor snapping candidate grid of the selected upper side of the rectangle is calculated, and at step S10, the nearest neighbor snapping candidate grid of the selected right side is calculated.

As shown in FIG. 5B, in this embodiment, the horizontal grid 12b is obtained as the result at step S8, and the vertical grid 11d is obtained as the result at step S10.

Thereafter, a check is performed to determine whether the distances between the snapping candidate grids obtained at steps S8 and S10 and the respective target sides of the rectangle are smaller than the predesignated threshold values (the threshold value Xth in the X direction and the threshold value Yth in the Y direction) (step S12). When the distances are smaller than the threshold values, the target sides of the rectangle are caused to snap the corresponding snapping candidate grids (step S13) and the processing is thereafter terminated (END). When the distances are equal to or greater than the threshold values, the sides of the rectangle are inhibited from snapping the snapping candidate grids (step S14), and the processing is terminated (END). In this embodiment, since the distance between the upper side of the rectangle and the horizontal grid 12b is smaller than the threshold value Xth and the distance between the right side of the triangle and the vertical grid 11d is smaller than the threshold value Yth, the upper side and the right side of the rectangle are caused to snap the horizontal grid 12b and the vertical grid 11d, respectively.

Figure 6:
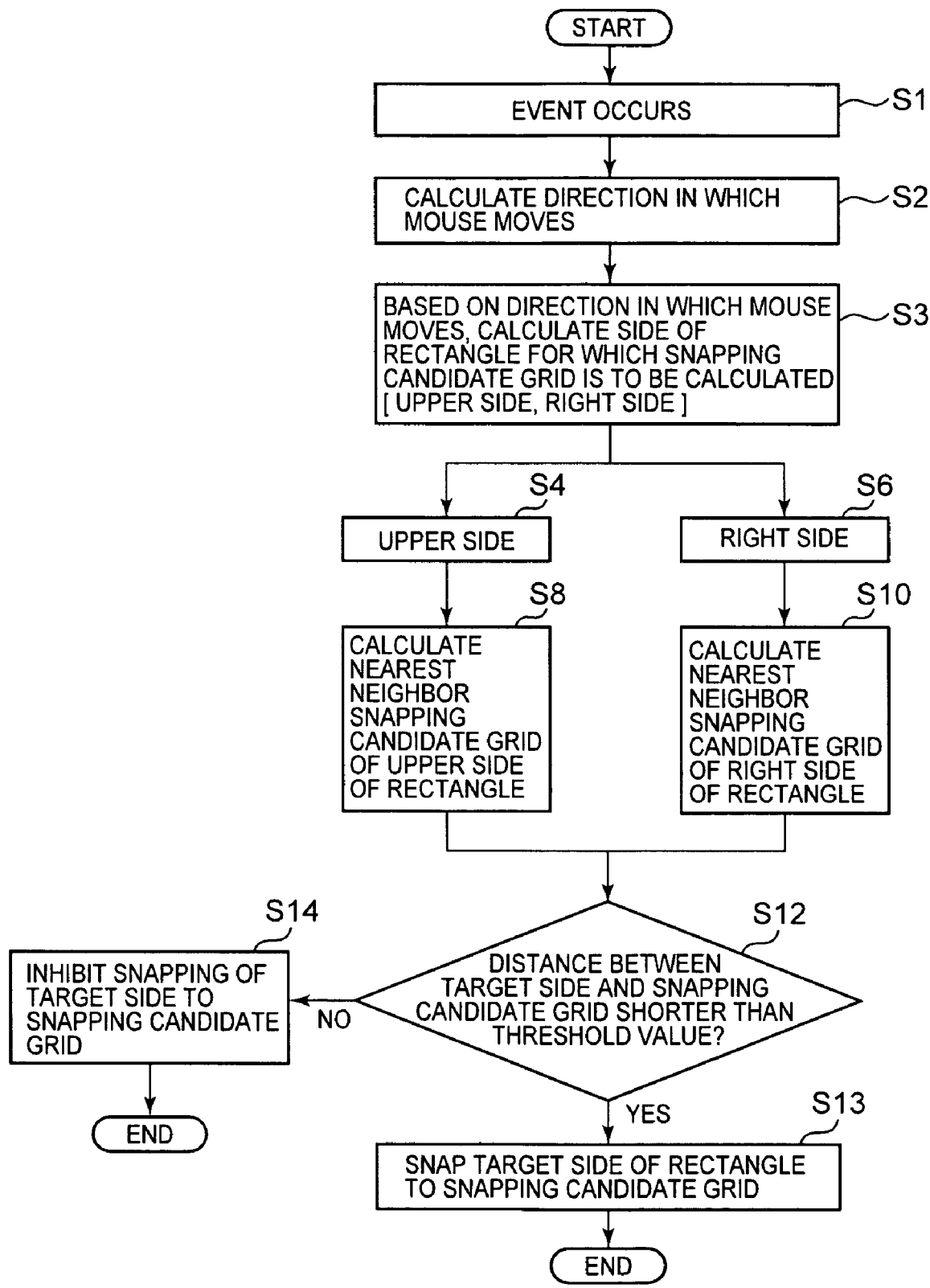
FIG. 6 is a flowchart showing the processing for an object editing method according to an embodiment of the present invention.

When the event that, using the mouse 13, the object 10 is held and moved up rightward occurs repetitively, the processing shown in FIG. 6 is repeated. As a result, the snap function is enabled only for the upper side and right side of the rectangle in the direction in which the object 10 is moving, and is disabled for the lower side and left side that are on the side opposite to the direction in which the object 10 is moving. As a result, the number of snaps can be reduced, and the movement of the object 10 by using the mouse 13 can be performed smoothly. Further, the drag-and-drop operation for the object 10 and the usability can be improved.

Figure 7:
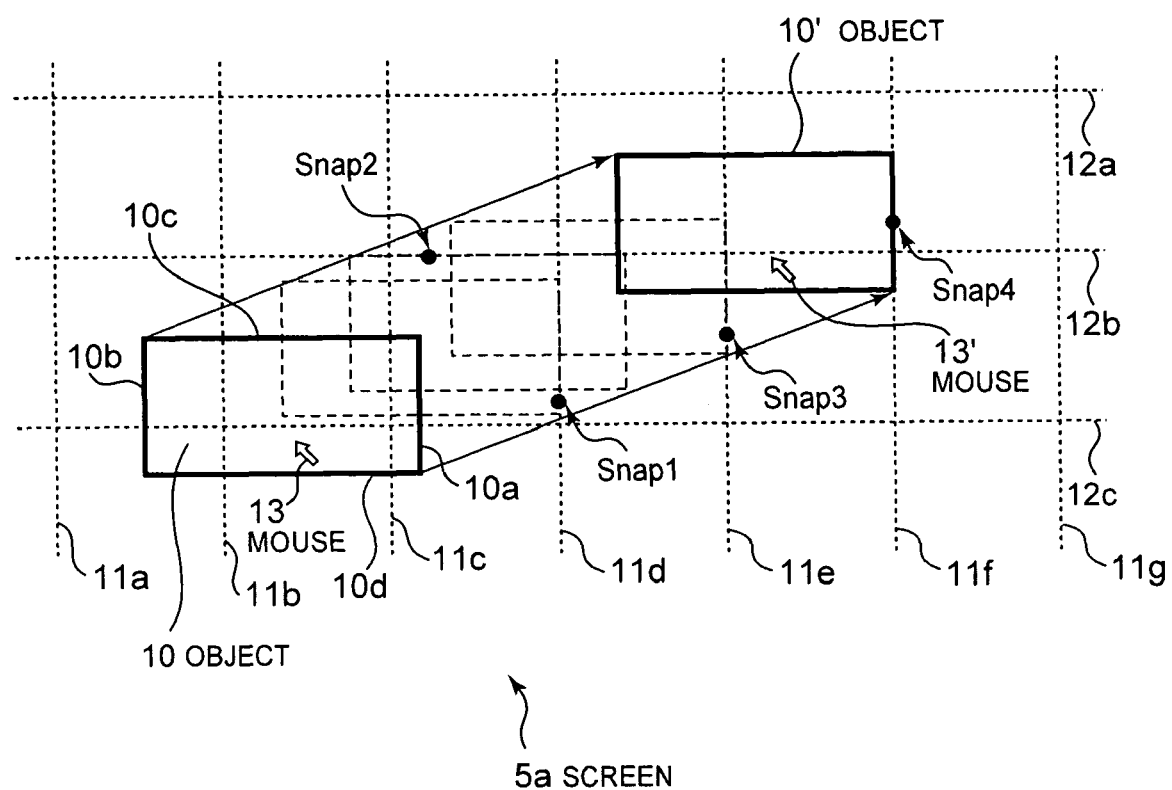
FIG. 7 is a diagram for explaining the frequency of the performance of a snap function for moving an object using the object editing method according to an embodiment of the present invention.
Figure 8:
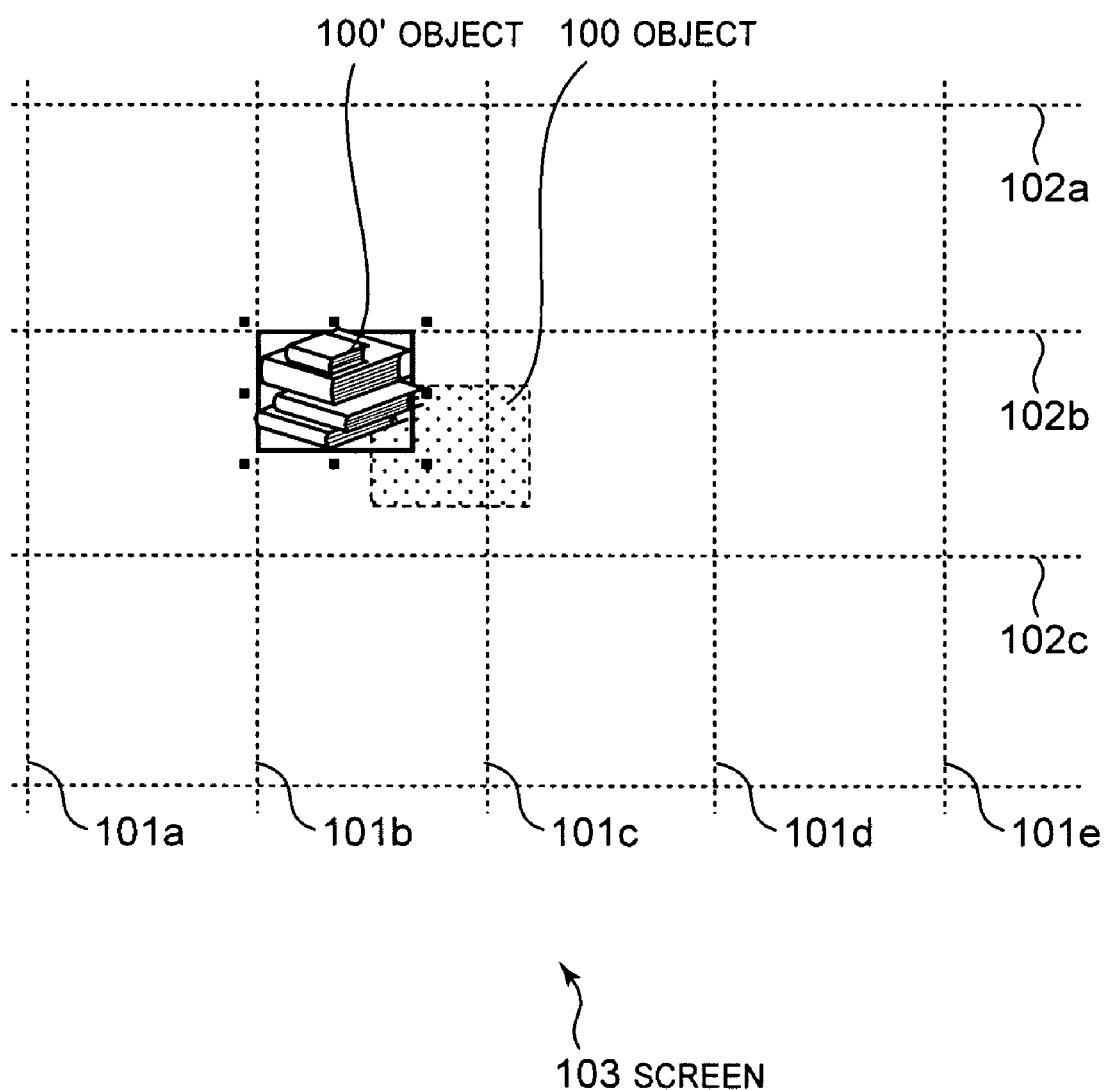
FIG. 8 is a diagram showing a conventional object editing screen for an electronic document.
Figure 9:
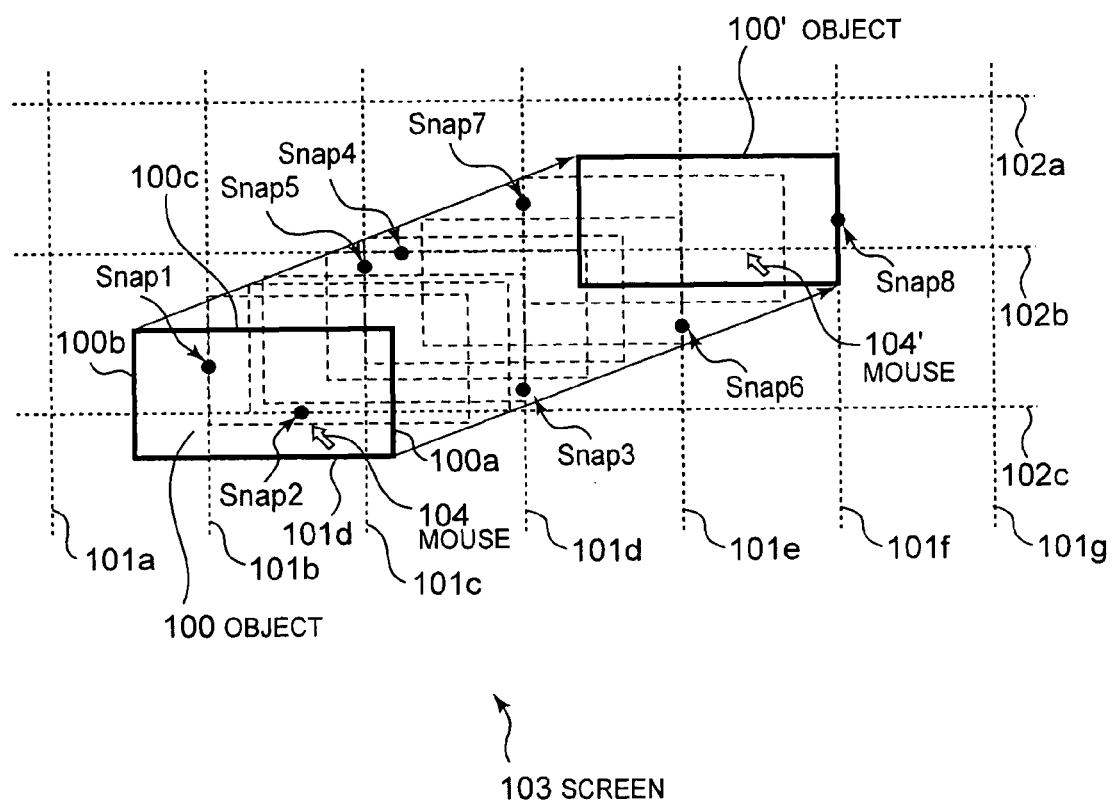
FIG. 9 is a diagram showing the frequency of the performance, for an electronic document, of a snap function for moving an object on a conventional object editing screen.

FIG. 7 is a diagram for explaining the frequency of the operation of the snap function when the event occurs repetitively, and the object 10 is moved to the position indicated by the object 10'. Until the object 10 is moved to the position indicated by the object 10', i.e., until the right side 10a is caused to snap the vertical grid 11f, a total eight snaps will occur when the conventional snap function is used, while only a total of four snaps (Snap1 to Snap4) will occur when the object editing method of this embodiment is employed. That is, the right side 10a is caused to snap the vertical grid 11d, the upper side 10c is caused to snap the horizontal grid 12b, the right side 10a is caused to snap the vertical grid 11e, and thereafter, the right side 10a is caused to snap the vertical grid 11f.

As described above, it has been found that, by employing the object editing method of this invention, the number of snapping operations can be reduced to about half, that the movement of the object 10 by using the mouse 13 can be performed smoothly, and that the drag-and-drop operation of the object 10 and the usability can be improved.

The specific mode and the embodiment of the present invention have been explained. The present invention, however, is not limited to the mode and the embodiment explained herein, and the design of the present invention can be variously modified without departing from the disclosed technical scope of the invention.

According to the object editing system and the object editing method of the invention, the snap function is enabled only for the sides of the rectangle in the direction in which the object moves, and is disabled for the sides of the rectangle opposite to the direction in which the object moves. Thus, the number of performances of snap operations can be reduced, and the movement of the object by using the mouse can be smoothly performed. As a result, the drag-and-drop operation for the object and the usability can be improved.

Further, according to the object editing system and the object editing method of the invention, when compared with the conventional complicated snap function, i.e., the method whereby the snap function is temporarily disabled by using the shift key together, the object editing process can be automatically performed using a single hand without having to learn any complicated snap function, and the frequency at which the snap function occurs can be reduced.

Therefore, the present invention can be applied to various types of software, such as word processor software that includes an object editing function, CAD software and WEB design software, and the computer systems that employ them.

The invention claimed is:

1. An object editing system, comprising:
   arrangement means for arranging a rectangular object and a snap target in a given display area;
   moving means for moving the object in the display area using a pointer;
   snap means for causing the object to snap the snap target only on the basis of a distance between the object and the snap target as the object is moved toward the snap target, and independently of a distance between the pointer and the snap target;
   restriction means for inhibiting the object from snapping the snap target on a side opposite to the direction in which the object is moving as the object is moved away from the snap target, and independently of a distance between the pointer and the snap target; and
   a display for displaying the object.

2. An object editing system according to claim 1, wherein the snap means causes the object to snap the snap target if the distance between the object and the snap target has become smaller than a predetermined threshold value.

3. An object editing system according to claim 1, wherein a plurality of snap targets are present on a path along which the object moves.

4. An object editing system according to claim 3, wherein the display area is a two-dimensional display area, and the snap targets are a plurality of vertical grid lines and a plurality of horizontal grid lines; wherein the snap means causes a side of the object to snap a vertical grid line or a horizontal grid line on a basis of a distance between the side of the object and the vertical grid line or the horizontal grid line; and wherein the restriction means inhibits the sides of the object that are present on a side opposite to the direction in which the object is moving from snapping the plurality of vertical grid lines or the plurality of horizontal grid lines.

5. An object editing system according to claim 4, wherein, of the plurality of horizontal grid lines, the snap means selects a horizontal grid line closest to a side of the object that is present along a vertical component of the direction in which the object is moving, and causes the side to snap the selected horizontal grid line if a distance between the side and the horizontal grid line has been become smaller than a first threshold value; and wherein, of the plurality of vertical grid lines, the snap means selects a vertical grid line closest to a side of the object that is present along a horizontal component of the direction in which the object is moving, and causes the side to snap the selected vertical grid line if a distance between the side and the vertical grid line has become smaller than a second threshold value.

6. An object editing system according to claim 4, wherein the restriction means inhibits the sides of the object on a side opposite to the vertical component of the direction in which the object is moving from snapping the horizontal grid lines, and inhibits the sides of the object on a side opposite to the horizontal component of the direction in which the object is moving from snapping the vertical grid lines.

7. An object editing system according to claim 1, wherein the object has a plurality of snap references, the snap means causes a snap reference to snap a snap target based on a distance between the snap reference and the snap target, and the restriction means inhibits the snap references that are present on a side opposite to the direction in which the object is moving from snapping a snap target.

8. An object editing system according to claim 7, wherein the restriction means causes the snap references that are present on a same side as the direction in which the object is moving to snap the snap target.

9. An object editing system according to claim 7, wherein the display area is a two-dimensional display area defined by a vertical axis and a horizontal axis, and the restriction means inhibits the snap references that are present on a side opposite to a vertical component of the direction in which the object is moving from snapping the snap target, or inhibits the snap references that are present on a side opposite to a horizontal component of the direction in which the object is moving from snapping the snap target.

10. An object editing system according to claim 7, wherein the display area is a two-dimensional display area defined by a vertical axis and a horizontal axis, and the restriction means inhibits the snap references that are present on the side opposite to a vertical component of the direction in which the object is moving from snapping the snap target, and inhibits the snap references that are present on the side opposite to a horizontal component of the direction in which the object is moving from snapping the snap target.

11. An object editing system according to claim 1, wherein, in the display, the direction in which the object is moving matches a direction in which the pointer is moving.

12. An object editing system according to claim 1, wherein the display area is a two-dimensional display area defined by a vertical axis and a horizontal axis, and the direction in which the object is moving is either up rightward, directly rightward, down rightward, directly upward, directly downward, up leftward, directly leftward or down leftward.

13. An object editing system according to claim 1, wherein only an upper side and a right side of the object are enabled for snapping to the snap target in response to an up rightward movement of the object;
   wherein only the right side of the object is enabled for snapping to the snap target in response to a directly rightward movement of the object;
   wherein only a lower side and the right side of the object are enabled for snapping to the snap target in response to a down rightward movement of the object;
   wherein only the upper side of the object is enabled for snapping to the snap target in response to a directly upward movement of the object;
   wherein only the lower side of the object is enabled for snapping to the snap target in response to an directly downward movement of the object;
   wherein only the upper side and a left side of the object are enabled for snapping to the snap target in response to an up leftward movement of the object;
   wherein only the left side of the object is enabled for snapping to the snap target in response to a directly leftward movement of the object; and
   wherein only the lower side and the left side of the object are enabled for snapping to the snap target in response to a down leftward movement of the object.

14. An object editing program product stored on a computer readable medium, the computer readable medium comprising program code, which when executed, for:

arranging a rectangular object and a snap target in a given display area;

in response to a movement of the object in the display area due to a corresponding movement of a pointer, causing the object to snap the snap target only on a basis of a distance between the object and the snap target, and independently of a distance between the pointer and the snap target, as the object is moved toward the snap target while inhibiting the object from snapping the snap target on a side opposite to the direction in which the object is moving, and independently of a distance between the pointer and the snap target, as the object is moved away from the snap target; and displaying the object.

15. An object editing program product according to claim 14, wherein the object comprises a rectangle, further comprising program code for:

inhibiting the sides of the rectangle that are on a side opposite to a vertical component of the direction in which the object is moving from snapping horizontal grid lines, and inhibiting the sides of the rectangle that are on a side opposite to a horizontal component of the direction in which the object is moving from snapping vertical grid lines.

* * * * *